United States Patent [19]

Izumi et al.

[11] 4,277,983
[45] Jul. 14, 1981

[54] INTERLOCKING DEVICE FOR SHIFT ROD IN POWER TRANSMISSION

[75] Inventors: Seiji Izumi, Kitaooizumi; Kiyokazu Ookubo, Wako, both of Japan

[73] Assignee: Honda Giken Kogyo Kabushiki Kaisha, Tokyo, Japan

[21] Appl. No.: 70,990

[22] Filed: Aug. 30, 1979

[30] Foreign Application Priority Data

Sep. 4, 1978 [JP] Japan .................................. 53-107472
Sep. 4, 1978 [JP] Japan ........................... 53-120516[U]

[51] Int. Cl.³ .......................... G05G 5/10; G05G 9/18
[52] U.S. Cl. ........................................ 74/477; 74/475; 200/61.91; 340/70
[58] Field of Search ...................... 74/473 R, 475, 476, 74/477; 116/28.1, DIG. 20; 200/61.88, 61.91; 340/70

[56] References Cited

U.S. PATENT DOCUMENTS

| | | | |
|---|---|---|---|
| 1,757,014 | 5/1930 | Gregorieff | 200/61.88 |
| 2,231,429 | 2/1941 | Simmons | 340/70 |
| 3,423,549 | 1/1969 | Sondej | 340/70 X |
| 3,731,554 | 5/1973 | Renk | 74/475 |
| 3,898,401 | 8/1975 | Noba et al. | 200/61.88 X |
| 3,962,930 | 6/1976 | Frazee | 74/477 |
| 4,174,644 | 11/1979 | Nagy et al. | 74/477 |
| 4,193,316 | 3/1980 | Kelbel | 74/477 |

*Primary Examiner*—Allan D. Herrmann
*Attorney, Agent, or Firm*—Polster, Polster and Lucchesi

[57] ABSTRACT

An interlocking device for a power transmission operating rod in a power transmission mechanism of a type, wherein the sliding direction of a shift fork shaft intersects with the axial line of the power transmission operating rod, and which is constructed with a supporting frame in the form of a letter "U" fitted at the lower part of a power transmission casing, a guide shaft fixed on the U-shaped supporting frame with the axis thereof being disposed in the same direction as the sliding direction of the shift fork shaft, a shift shaft supported on the guide shaft in a slidable and rotatable manner, a selector having an interlocking mechanism which rotates together with the shift shaft and is rotatably supported on the guide shaft which permits slide-movement of the shift shaft, a selection lever rotatably supported on the U-shaped supporting frame, the one end of which is coupled with the power transmission operating rod and the other end of which is coupled with the selector, and a shift lever rotatably supported on the U-shaped supporting frame, the one end of which is coupled with the power transmission operating rod and the other end of which is coupled with the shift shaft.

Also disclosed is a reverse shift indicating device for a power transmission mechanism, which is constructed with a reverse shift fork mounted in the inner wall surface of a power transmission casing at the lower part thereof, and a switch for turning on and off a back-light supported on the wall surface of the power transmission casing, a contact point of the switch being positioned in the operating locus of the reverse shift fork.

5 Claims, 6 Drawing Figures

INTERLOCKING DEVICE FOR SHIFT ROD IN POWER TRANSMISSION

BACKGROUND OF THE INVENTION

This invention relates to an interlocking device between a power transmission operating rod and a shift fork shaft in an automobile, and more particularly, it is concerned with such interlocking device of a type, in which the axial line of the operating rod and the sliding direction of the shift fork shaft intersect each other. The present invention also relates to an indicator device for a reverse shift shaft.

SUMMARY OF THE INVENTION

It is an object of the present invention to provide a device for interlocking a transmission operating rod and a shift fork shaft, which is small in size and does not occupy a large space from the standpoint that it is installed at the lower part within the transmission casing, and which is also built as a unit component in consideration of its assembly to the transmission casing.

It is another object of the present invention to provide a device for indicating a reverse shift of the power transmission.

According to the present invention, in one aspect thereof, there is provided an interlocking device for a power transmission operating rod in a power transmission mechanism of a type, wherein the sliding direction of a shift fork shaft intersects with the axial line of the power transmission operating rod, and which is constructed with a supporting frame in the form of a letter "U" fitted at the lower part of a power transmission casing, a guide shaft fixed on the U-shaped supporting frame with the axis thereof being disposed in the same direction as the sliding direction of the shift fork shaft, a shift shaft supported on the guide shaft in a slidable and rotatable manner, a selector having an interlocking mechanism which rotates together with the shift shaft and is rotatably supported on the guide shaft which permits slide-movement of the shift shaft, a selection lever rotatably supported on the U-shaped supporting frame, the one end of which is coupled with the power transmission operating rod and the other end of which is coupled with the selector, and a shift lever rotatably supported on the U-shaped supporting frame, the one end of which is coupled with the power transmission operating rod and the other end of which is coupled with the shift shaft.

According to the present invention, in another aspect thereof, there is provided a reverse shift indicating device for a power transmission mechanism, which is constructed with a reverse shift fork mounted in the inner wall surface of a power transmission casing at the lower part thereof, and a switch for turning on and off a back-light supported on the wall surface of the power transmission casing, a contact point of the switch being positioned in the operating locus of the reverse shift fork.

There has thus been outline, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawing, forming a part of the specification, in which.

DETAILED DESCRIPTION OF PREFERRED EMBODIMENTS

In the following, the present invention will be described in detail in reference to preferred embodiment thereof.

Figure 1:
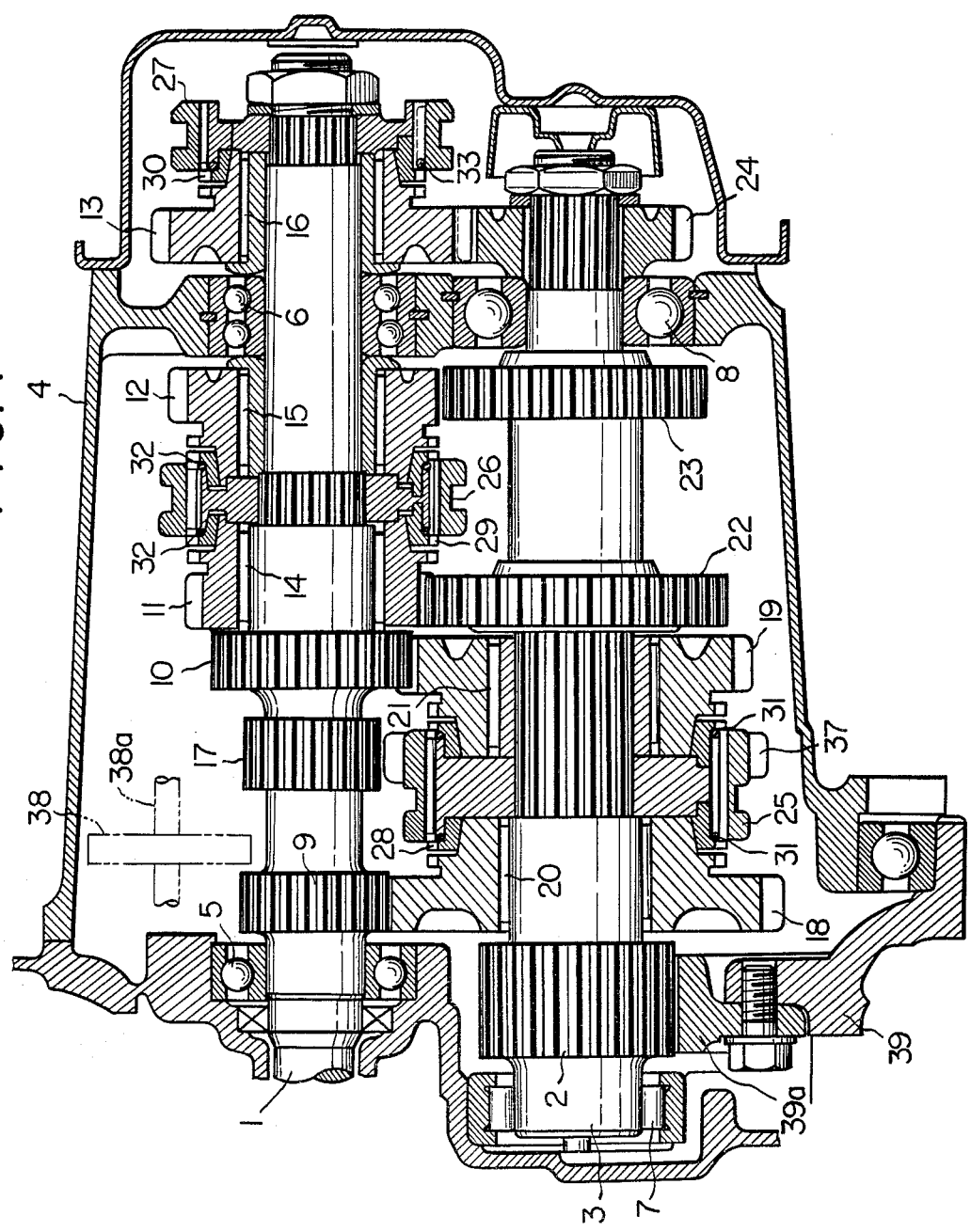
FIG. 1 is a plan view showing a gear train in a power transmission mechanism.

FIG. 1 illustrates a five-stage speed changing gear train, in which a main shaft 1 positioned on one and the same axial line as a clutch and a counter shaft 3 having a final drive gear 2 are supported in parallel each other within a power transmission casing 4 through bearings 5 to 8. Main first and second speed gears 9, 10 are integrally provided at an appropriate space interval on the main shaft 1. Main third to fifth speed gears 11 to 13 are also provided on the main shaft 1 through bearings 14 to 16. Between the first speed gear 9 and the second speed gear 10 on the main shaft 1, there is integrally provided a main reverse gear 17 in proximity to the second speed gear 10.

On the counter shaft 3, on the other hand, there are mounted a counter first speed gear 18 and a counter second speed gear 19 through respective bearings 20 and 21. These counter first and second speed gears 18, 19 are constantly meshed with the main first and second speed gears 9 and 10, respectively. On the other hand, counter third to fifth speed gears 22 to 24 constantly meshed with the main third to fifth speed gears 11 to 13 respectively are spline-connected.

Between the counter first and second speed gears 18, 19 and the main third and fourth speed gears 11, 12, there are provided speed selection sleeves 25, 26 to be operated by a shift fork (not shown in the drawing). Another speed selection sleeve 27 is provided in the same manner at a position outside the main fifth speed gear 13. In order to take synchronism in the mesh-engagement between the speed selection sleeves 25 to 27 and the gears 11, 12, 13, 18 and 19, there is provided a synchro-mesh mechanism consisting of synchronizer hubs 28 to 30 which are spline-connected with the main shaft 1 and the counter shaft 3, on the outer periphery of which the respective speed selection sleeves 25 to 27 are meshed; blocking rings 31 to 33 interposed between the hubs and the bosses for the gears 11, 12, 13, 18 and 19; and synchronizer springs 34 to 36. A counter reverse gear 37 is mounted on the outer peripheral surface of the counter first and second speed selection sleeve 25 in confrontation to the main reverse gear 17.

A reverse idle gear 38 which transmits motive power from the main reverse gear 17 to the counter reverse gear 37 is slidably mounted on a rotational shaft 38a held in the power transmission casing in proximity to the first speed gear 9 and the counter first speed gear 18. The final drive gear 2 on the abovementioned counter shaft 3 is meshed with a gear 39a of a differential gear 39.

FIGS. 2 to 6 illustrate the interlocking device for the abovementioned power transmission and the operating rod thereof.

Figure 3:
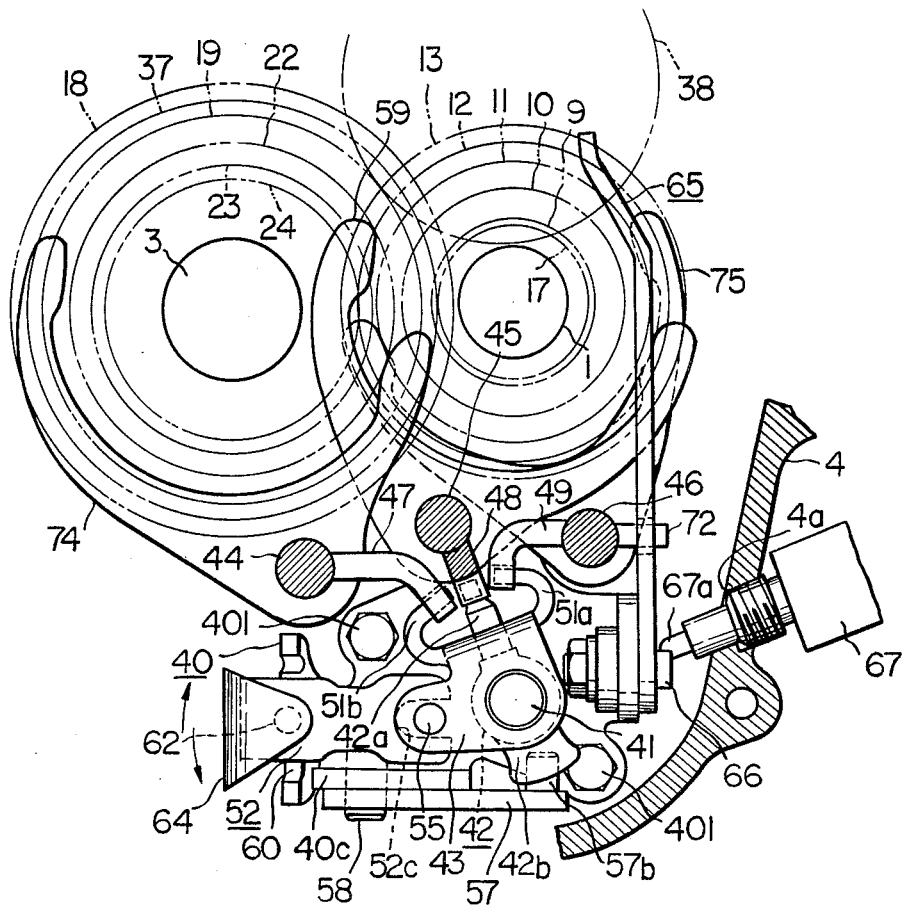
FIG. 3 is a front view of the interlocking device shown in FIG. 2.

A reference numeral 40 designates a U-shaped supporting frame which supports each of the interlocking members. The frame is fixedly secured to the lower part within the power transmission casing 4. A guide shaft 41 having the axial line in the same direction as that of the shift fork shafts 44, 45 and 46 is held between the bottom side 40a of the supporting frame 40 and the wall surface of the power transmission casing 4 opposite to the bottom side 40a. A shift shaft 42 is fitted on the guide shaft 41 in a slidable manner as well as rotatable manner. A selector 43 in an inversed U-shape is also rotatably fitted on the guide shaft 41 at its both sides 43a, 43a with the shaft 42 being interposed between the two sides 43a, 43a. The abovementioned shift shaft 42 has three shift pieces 47, 48 and 49 for the respective shift fork shafts 44, 45 and 46, and a projected part 42a to be selectively engaged with the shift pieces 47, 48 and 49. The projected part 42a is slidably fitted in a long hole or slot 50 formed in the flat bottom part 43b of the inverse U-shaped selector 43. The selector 43 has, at a position of the flat bottom part 43b thereof embracing the slot 50, a pair of projected parts 51a, 51b for interlocking which are formed by bending in a substantially arcuate shape. The interlocking projections 51a, 51b become engaged with the shift pieces 47 and 49 of the shift fork shafts 44 and 46, when the projection 42a of the shift shaft 42 is engaged with the shift piece 48 of the third or fourth speed shift fork shaft 45, as shown in FIG. 3, whereby the shift fork shafts 44 and 46 are held in an inoperative state. This interlocking operation is done by engagement of the right projection 51a with the shift pieces 48 and 49 at the time of the first or second speed shifting, and by engagement of the left projection 51b with the shift pieces 47 and 48 at the time of the fifth speed or the reverse shifting. A selection lever 52 which rotates the abovementioned shift shaft 42 and selector 43 together, and selects the speed changing ratio is in a substantial form of a letter "L," one of the sides of which (designated by a numeral 52a) is rotatably fitted onto one side leg 40b of the abovementioned supporting frame 40 by means of a bolt 53. The tip end of the side 52a of the selection lever 52 is engaged with a fork portion 54a which is an integral part of a power transmission operating rod 54 (FIG. 4), while another fork-shaped portion 52c at the tip end of the other side of the selection lever 52 is engaged with a projection 55 of the abovementioned selector 43. A numeral 56 refers to a return spring for the selection lever 52.

A shift lever 57 which causes the shift shaft 42 to slide along the guide shaft 41, and causes the shift fork shafts 44, 45 and 46 to reciprocally move therealong is in the form of a letter "L," the bent portion of which is pivotally supported through a shaft 58 on a supporting plate 40c fixed to the bottom side 40a and one of the legs (designated by a numeral 40b) of the supporting frame 40. The bulged tip end 57a at one side of the L-shaped shift lever 57 is engaged with a fork portion 54b mounted at one end of the power transmission operating rod 54, while the tip end 57b at the other side thereof is engaged with a fork portion 42b of the shift shaft 42.

Figure 4:
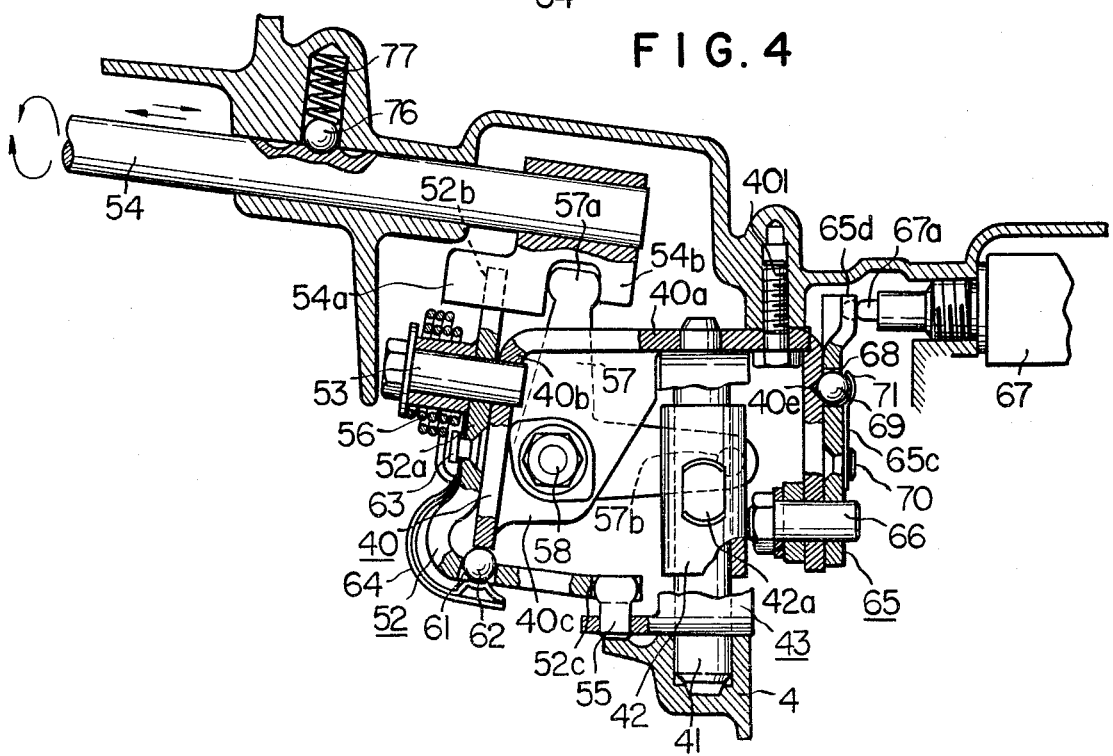
FIG. 4 is a plan view of the interlocking device shown in FIG. 2.

In the above-described construction, when the power transmission operating rod 54 is rotated in an arrowed direction in FIG. 4, the selection lever 52 rotates in an arrow direction in FIG. 3 to cause the selector 43 to rotate in the same direction, whereby the third and fourth speed gear is selected in the state of the speed changing ratio, for example, in the state as shown in FIG. 3. When the power transmission operating rod 54 is reciprocally moved, the projected part 42a of the shift shaft 42 causes the shift fork shaft 45 to reciprocally move through the shift piece 48 engaged with the projected part 42a, whereby the abovementioned selection sleeve 26 is meshed with the gear 11 or 12 by the fork 59 to perform the speed changing operation.

Figure 5:
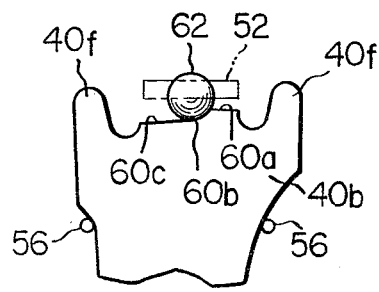
FIG. 5 is a side view showing a cam face of a supporting frame.

At the end face of the supporting frame 40 confronting to the selection lever 52, there are formed three-stage cam faces 60a, 60b and 60c in accordance with required numbers of selection stage, as shown in FIG. 5. A through-hole 61 is formed at a position of the selection lever 52 confronting to the cam faces. Within the through-hole 61, there is fitted a steel ball 62 in a rotatable manner, which is press-contacted to the cam faces by means of a leaf spring 64 in a partially arcuate form with its one end being fixed on the external surface of the selection lever 52 by a rivet 63 so that the entire spring may follow the contour thereof. Projections 40f, 40f at the upper and lower parts of the cam faces constitute the stopper for the selection lever 52 and a recessed part at the lower part thereof constitutes a machining hole. The ball 62, the leaf spring 64 and the cam faces 60a, 60b and 60c constitute a click mechanism, whereby movement of the selection lever 52 becomes accurate and any movement thereof in unnecessary selection directions can be restricted.

A reverse shift fork 65 is held on a shaft 66 in an oscillatable manner at the outside of the other leg side 40d of the abovementioned supporting frame 40 in proximity to the inner wall surface at the lower part of the power transmission casing. The reverse shift fork 65 is in an L-shape. At the extreme end of the vertical side 65a of this reverse shift fork 65, there is provided a fork portion 65b which is engaged with the side surface of the reverse idle gear 38, while, at the extreme end of the horizontal side 65c of the reverse shift fork 65, there is provided a raised portion 65d which opens and closes a switch 67 for turning on and off a lamp (not shown) to indicate the reverse shifting as effected.

The abovementioned switch 67 is fitted on the wall surface at the lower part of the power transmission casing 4 as shown in FIG. 3, a contact point 67a of which is positioned within an oscillating locus of a raised portion 65d of the abovementioned reverse shift fork 65.

In the horizontal side 65c of the abovementioned reverse shift fork 65, there is formed a through-hole 68, into which a steel ball 69 is rotatably fitted. The steel ball 69 is press-contacted to a recess 40e of the supporting frame 40 by a leaf spring 71 fastened by a rivet 70 to the reverse shift fork 65 from outside. By the above-described construction, shaking of the reverse shift fork 65 is prevented.

Figure 6:
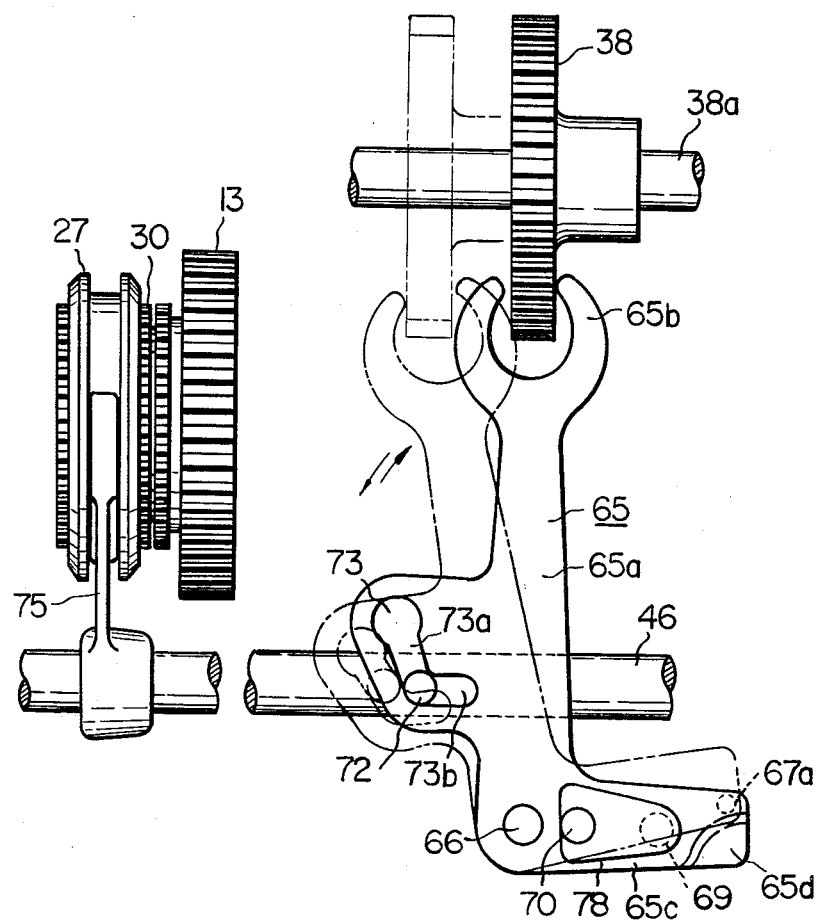
FIG. 6 is an explanatory diagram for the reverse shifting and the fifth speed shifting.

The shift transmission mechanism to the abovementioned reverse shift fork is in such a construction that, in the illustrated case, a pin 72 fitted on the shift fork shaft 46 is fitted into an L-shaped groove 73 formed in the vertical side of the reverse shift fork 65. As shown in FIG. 6, when the reverse shifting and the fifth speed shifting are not performed, the pin 72 is positioned at the bent portion of the L-shaped groove 73.

In the above-described construction, when the shift fork shaft 46 is moved to the left side in FIG. 6 by the power transmission operating rod 54 as mentioned above, the pin 72 slides along the vertical portion 73a of the L-shaped groove 73 with the consequence that the reverse shift fork 65 oscillates in the arrowed direction to cause the reverse idle gear 38 to be meshed with the gears 17, 37. On the other hand, since the shift fork shaft 46 moves rightward in FIG. 6 at the time of the fifth speed shifting, the pin 72 slides along the horizontal side 73b of the L-shaped groove 73, the movement of which is not transmitted to the reverse shift fork 65.

In so constructing the transmission device, it becomes possible to form the pin 72 in true circle form and to transmit its movement immediately to the reverse shift fork in comparison with the construction as disclosed in U.S. Pat. No. 4,022,079 issued to the same assignee-to-be of the present application, in which a flat or horizontal surface is formed on one part of the pin, the part of which is caused to contact the inner surface of the L-shaped groove to contribute the pin to prevent shaking of the reverse shift fork. Therefore, there is no waste in the operating stroke, and the working cost can be reduced.

Incidentally, a numeral 74 refers to a first and second speed shift fork, a numeral 75 refers to a fifth speed shift fork, and numerals 76 and 77 respectively refer to a steel ball and a coil spring of a click stopper mechanism for the power transmission operating rod. A reference numeral 59 designates a third and fourth speed shift fork.

As stated above, since the present invention is of such a construction that each of the interlocking members such as the shift shaft 42, the selector 43, and so on is supported on the U-shaped supporting frame 40 in a unit construction, the device as a whole can be reduced in size, the space to be occupied by the device can be limited to the minimum within the power transmission casing, and, moreover, assembly thereof to the casing becomes easy. Further, since the guide shaft 41 of the shift shaft 42 is arranged in parallel with the shift fork shafts 44 to 46, the bottom wall of the power transmission casing does not project downward, hence the road clearance of the vehicle can be made high. Furthermore, owing to the click stopper mechanism provided between the selection lever 52 and the reverse shift fork 65 and the supporting frame 40, unnecessary movement and shaking of both levers can be prevented. Various other effects can also be derived from such construction.

In the following, the reverse shift indicator device for the power transmission which is the other characteristic feature of the present invention will be explained.

There have so far been known an art of indicating the reverse shift operation by effecting opening and closing of a back-light switch through movement of the reverse shift fork shaft. In this case, there are adopted various expedients such that the end face of the abovementioned reverse shift fork shaft is contacted to the switch, or a projected part for switch opening and closing is fixedly secured onto a part of the circumferential surface of the shaft. In the case of the former, however, since the switch projects from the end face of the power transmission casing, excessive space is required around the casing, which hinders miniaturization of the power transmission mechanism as a whole. In the case of the latter, as the switch can be disposed on the upper surface of the power transmission casing, such hindrance is removed, although there still exist various problems such that not only many working steps are required for welding the switch onto the shift fork shaft, but also distortion would apprehensively occur in the shaft per se with the consequence that function of the shift fork shaft will be impaired.

The present invention has been proposed in view of these points of problems encountered in the conventional structure as mentioned above, according to which it is intended to simplify the construction for fitting the back-light switch and its operating mechanism to thereby attain size-reduction in the power transmission mechanism as well as reduction in the number of working steps.

In the following, a preferred embodiment of the present invention will be explained in reference to FIGS. 2, 3 and 6.

In FIG. 3, a reference numeral 4 designates the power transmission casing having in its interior the main shaft 1 and the counter shaft 3 connected with a clutch mechanism. On each of the shafts 1 and 3, there are mounted respectively the first to fifth speed gears 9 to 13, the counter first to fifth speed gears 18, 19, 22, 23 and 24, the reverse gear 17, and the counter reverse gear 37. On the upper part within the abovementioned power transmission mechanism, there is disposed the reverse idle gear 38 which is to be meshed with the reverse gear 17 and the counter reverse gear 37 at the time of the reverse shifting.

At the lower part of the abovementioned main shaft 1 and the counter shaft 3, there are provided the shaft 44 having the first and second speed shift fork 74, the shaft 45 having the third and fourth speed shift fork 59, and the shaft 46 having the fifth speed shift fork 75 in parallel each other. The reverse shift fork 65 is in the form of a letter "L," the bent portion of which is pivotally and oscillatably fitted through the shaft 66 on the side surface 40d of the U-shaped supporting frame 40 which supports the interlocking mechanism for the power transmission operating rod (not shown in the drawing) and each of the abovementioned shift fork shafts 44, 45 and 46 in proximity to the inner wall surface of the power transmission casing 4. The pin 72 is fixedly secured on the peripheral surface of the abovementioned fifth speed shift fork shaft 46. The pin 72 is engaged with the L-shaped groove 73 formed in the vertical side 65a of the reverse shift fork 65, as shown in FIG. 6, and the movement of the shift fork shaft 46 is transmitted to the reverse shift fork 65.

The abovementioned L-shaped reverse shift fork 65 has the fork portion 65b to be engaged with the side surface of the reverse idle gear 38 at the end part of the vertical side 65a thereof and the raised part 65d at the end part of the horizontal side 65c thereof. By this raised part 65d, the switch 67 to turn on and off the lamp (not shown in the drawing) to indicate the reverse shift operation is opened and closed. The abovementioned switch 67 is screwed from outside into the screw hole 4a perforated in the lower side surface of the power transmission casing 4, and fixed at that position, the contact point 67a of which is positioned in the oscillating locus of the raised part 65d of the reverse shift fork 65.

Figure 2:
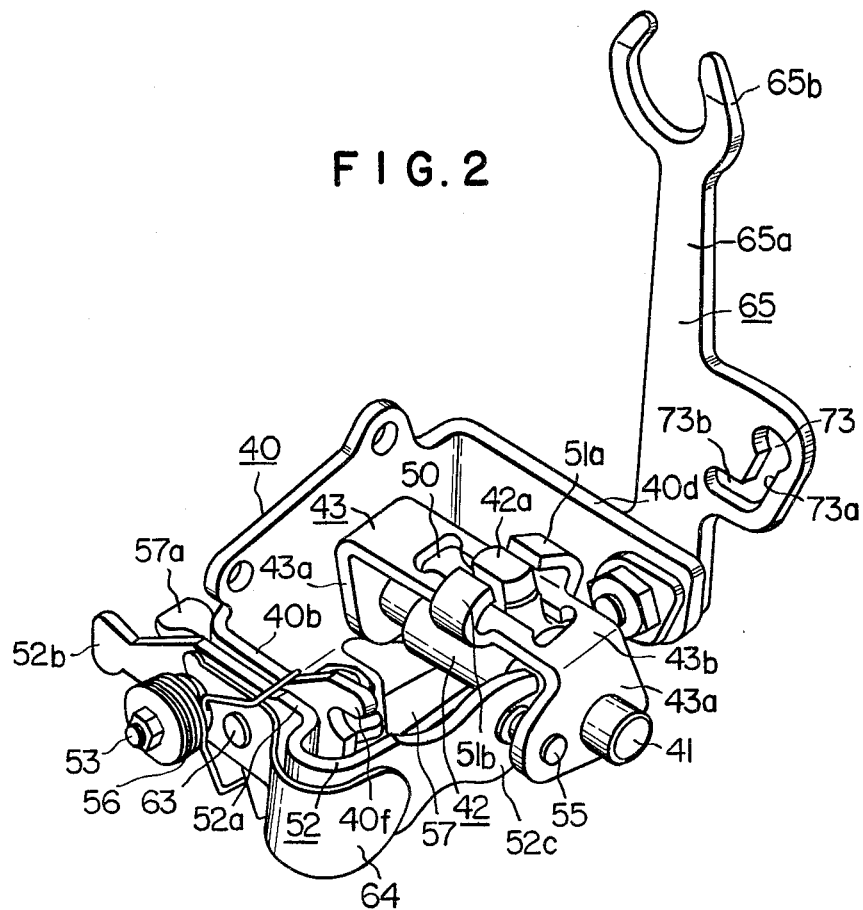
FIG. 2 is a perspective view of an interlocking device according to the present invention.

In the above-described construction, when the power transmission operating rod is operated at the time of the reverse shifting, and the operating force thereof is transmitted through a route of the abovementioned interlocking mechanism→the shift fork shaft 46→the pin 72→L-shaped groove 73 in the reverse shift fork, the pin 72 which is usually positioned at the bent portion of the L-shaped groove 73 moves to the vertical side 73a of the L-shaped groove, and the reverse shift fork 65 oscillates in the arrowed direction in FIG. 2 to thereby slide-move on the shaft 38a of the reverse idle gear and cause the reverse gear 17 to be meshed with the counter reverse gear 37. At the same time, the raised part 65d of the reverse shift fork 65 pushes the contact point 67a of the switch 67 to thereby close the reverse shift indicating circuit and to turn on the indicator lamp.

At the time of the fifth speed shifting, the pin 72 slides along the horizontal side 73b of the L-shaped groove 73, so that the reverse idle gear 38 does not move.

Incidentally, when the power transmission operating rod is rotated, the selection lever 52 moves in the arrowed direction to cause the selector 43 coupled in conjunction with the pin 55 and the groove 52c of the fork portion to rotate with the guide shaft 41 as its center of rotation, whereby the speed changing ratio is selected. By reciprocally moving the abovementioned rod, the shift lever 57 rotates in the arrowed direction with the shaft 58 as the center of rotation, and the shift shaft 42 coupled in conjunction with the pin 57b and the groove 42b moves in the vertical direction with respect to the surface of the drawing sheet to cause the shift fork shaft 45 to move in the direction normal to the surface of the drawing sheet through the shift piece 48 engaged with the projected part 42a of the shift shaft, thereby shifting is done on the third or fourth speed.

At the time of the third or fifth speed shifting, the projected part 51b for interlocking of the selector 43 becomes engaged with the other shift pieces 47, 49 to hold the shift fork shaft 44, 46 in their inoperative state. This interlocking is effected by engagement of the right side projected part 51a with the shift piece 48 at the time of the first or second speed shifting, and by engagement of the left side projected part 42a with the shift piece 48, 47 at the time of the fifth speed or reverse shifting. A numeral 401 refers to a bolt for fixing the supporting frame 40 to the power transmission casing 4, and a numeral 69 refers to a steel ball fitted in the hole perforated in the reverse shift fork. The steel ball 69 is press-contacted to the recessed portion (not shown) in the supporting frame 40 by urging it through a leaf spring 78 fixed to the reverse shift fork 65 by means of a rivet 70 to thereby prevent the reverse shift fork from shaking. Numerals 62 and 64 respectively designate the steel ball and the leaf spring constituting the click stopper mechanism of the selection lever 52.

As stated in the foregoing, since the present invention is so constructed that the switch 67 for turning on the back-light is projected into the inner wall surface of the power transmission casing 4 at its lower part where it constitutes a dead space, and the contact 67a is opened and closed by the reverse shift fork 65, working of the shift fork shaft 46 as has been done in the conventional device is unnecessary, and also the space to accommodate the switch is not required to be provided around the transmission casing. Further, by manufacturing the reverse shift fork 65 with a metal plate, the raised part 65d for the switch opening and closing can be formed easily by a simple pressing work. There are still other advantages to be derived from the present invention.

What is claimed is:

1. An interlocking device for a power transmission operating rod in a power transmission mechanism of a type, wherein the sliding direction of a shift fork shaft intersects with the axial line of the power transmission operating rod, said interlocking device comprising, in combination:
    (a) a supporting frame in the form of a letter "U" fitted at the lower part of a power transmission casing;
    (b) a guide shaft fixed on said U-shaped supporting frame with the axis thereof being disposed in the same direction as the sliding direction of said shift fork shaft;
    (c) a shift shaft supported on said guide shaft in a slidable and rotatable manner;
    (d) a selector having an interlocking mechanism which rotates together with said shift shaft and is rotatably supported on said guide shaft which permits slid-movement of said shift shaft;
    (e) a selection lever rotatably supported on said U-shaped supporting frame, one end of which is coupled with said power transmission operating rod and the other end of which is coupled with said selector; and
    (f) a shift lever rotatably supported on said U-shaped supporting frame, one end of which is coupled with said power transmission operating rod and the other end of which is coupled with said shift shaft.

2. An interlocking device for a transmission operating rod in a power transmission mechanism of a type, wherein the sliding direction of a shift fork shaft intersects with the axial line of the power transmission operating rod, said interlocking device comprising, in combination:
    (a) a supporting frame in the form of a letter "U" fitted at the lower part of a power transmission casing;
    (b) a guide shaft fixed on said U-shaped supporting frame with the axial center thereof being disposed in the same direction as the sliding direction of said shift fork shaft;
    (c) a shift shaft supported on said guide shaft in a slidable and rotatable manner;
    (d) a selector having an interlocking mechanism which rotates together with the shift shaft, and is rotatably supported on said guide shaft which permits slide-movement of said shift shaft;
    (e) a selection lever rotatably supported on said U-shaped supporting frame, one end of which is connected with said power transmission operating rod, and the other end of which is connected with said selector;
    (f) a shift lever rotatably supported on said U-shaped supporting frame, one end of which is connected with said power transmission operating rod, and the other end of which is connected with said shift shaft;
    (g) cam faces formed on the end surface of said U-shaped supporting frame;
    (h) a steel ball rotatably fitted in a hole perforated in said selection lever at a position confronting to said cam faces; and (i) a leaf spring provided on said selection lever, and to press-contact said steel ball to said cam faces.

3. An interlocking device for a transmission operating rod in a power transmission mechanism of a type, wherein the sliding direction of a shift fork intersects with the axial line of said power transmission operating rod, said interlocking device comprising, in combination:
   (a) a supporting frame in the form of a letter "U" fitted at the lower part in a power transmission casing;
   (b) a guide shaft fixed on said U-shaped supporting frame with the axis thereof being disposed in the same direction as the sliding direction of said shift fork shaft;
   (c) a shift shaft supported on said guide shaft in a slidable and rotatable manner;
   (d) a selector having an interlocking mechanism which rotates together with the shift shaft, and is supported rotatably on said guide shaft which permits slide-movement of said shift shaft;
   (e) a selection lever rotatably supported on said U-shaped supporting frame, one end of which is connected to said power transmission operating rod, and the other end of which is connected with said selector;
   (f) a shift lever rotatably supported on said U-shaped supporting frame, one end of which is connected with said power transmission operating rod and the other end of which is connected with said shift shaft;
   (g) a reverse shift fork oscillatably mounted on said U-shaped supporting frame;
   (h) a steel ball rotatably fitted in a hole perforated in said reverse shift fork; and
   (i) a leaf spring provided on said reverse shift fork and to press-contact said steel ball onto the surface of the U-shaped supporting frame.

4. An interlocking device for a transmission operating rod in a power transmission mechanism of a type, wherein the sliding direction of a shift fork intersects with the axial line of said power transmission operating rod, said interlocking device comprising, in combination:
   (a) a supporting frame in the form of a letter "U" fitted at the lower part of a power transmission casing;
   (b) a guide shaft fixed on said U-shaped supporting frame with the axis thereof being disposed in the same direction as the sliding direction of said shift fork shaft;
   (c) a shift shaft supported on said guide shaft in a slidable and rotatable manner;
   (d) a selector having an interlocking mechanism which rotates together with said shift shaft and is rotatably supported on said guide shaft which permits slide-movement of said shift shaft;
   (e) a selection lever rotatably supported on said U-shaped supporting frame, one end of which is coupled with said power transmission operating rod and the other end of which is coupled with said selector; and
   (f) a shift lever rotatably supported on said U-shaped supporting frame, one end of which is coupled with said power transmission operating rod and the other end of which is coupled with said shift shaft;
   (g) a reverse shift fork oscillatably mounted on said U-shaped supporting frame;
   (h) an L-shaped groove formed in said reverse shift fork;
   (i) a pin slidably fitted in said L-shaped groove; and
   (j) a shift fork shaft to support said pin.

5. The interlocking device as set forth in claim 3 or 4, wherein said reverse shift fork oscillatably mounted on said U-shaped frame has a raised part which contacts a switch contact point for turning on and off a back light to actuate said back light switch, said contact point being provided in the operating locus of said reverse shift fork.

* * * * *